(12) United States Patent
Lindoff et al.

(10) Patent No.: US 8,023,600 B2
(45) Date of Patent: Sep. 20, 2011

(54) METHOD AND APPARATUS FOR INTERFERENCE REJECTION COMBINING AND DETECTION

(75) Inventors: Bengt Lindoff, Bjärred (SE); Johan Nilsson, Höllviken (SE); Fredrik Nordström, Lund (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 689 days.

(21) Appl. No.: 12/138,743

(22) Filed: Jun. 13, 2008

(65) Prior Publication Data

US 2009/0116568 A1  May 7, 2009

Related U.S. Application Data

(60) Provisional application No. 60/986,143, filed on Nov. 7, 2007.

(51) Int. Cl.
*H04L 1/02* (2006.01)
*H03D 1/04* (2006.01)
*H04B 15/00* (2006.01)

(52) U.S. Cl. .................. 375/347; 375/346; 455/137
(58) Field of Classification Search .................. 375/267, 375/316, 324, 340, 346–347, 259–260; 455/101, 455/278.1, 63.1, 67.13, 296, 501, 524, 561, 455/570; 370/491, 203, 204, 208, 480–481
See application file for complete search history.

(56) References Cited

U.S. PATENT DOCUMENTS

| | | | |
|---|---|---|---|
| 6,223,040 B1 * | 4/2001 | Dam | 455/447 |
| 6,842,476 B2 * | 1/2005 | Lindoff et al. | 375/144 |
| 6,922,434 B2 * | 7/2005 | Wang et al. | 375/148 |
| 7,397,842 B2 * | 7/2008 | Bottomley et al. | 375/148 |
| 2003/0092447 A1 * | 5/2003 | Bottomley et al. | 455/453 |
| 2005/0101279 A1 * | 5/2005 | Lee et al. | 455/278.1 |
| 2005/0249319 A1 | 11/2005 | Suh et al. | |
| 2006/0269023 A1 | 11/2006 | Chimitt et al. | |
| 2007/0147538 A1 | 6/2007 | Jung et al. | |
| 2007/0249350 A1 | 10/2007 | Jung et al. | |
| 2007/0298780 A1 | 12/2007 | Lindoff et al. | |
| 2008/0231500 A1 * | 9/2008 | Heikkila et al. | 342/159 |
| 2010/0136940 A1 * | 6/2010 | Hui et al. | 455/307 |

FOREIGN PATENT DOCUMENTS

EP    1523112 A1    4/2005

OTHER PUBLICATIONS

Bladsjo et al., Interference Cancellation Using Antenna Diversity For EDGE-Enhanced Data Rates in GSM and TDMA/136, 1999, Vehicular Technology Conference, 1999. VTC 1999-Fall. IEEE, vol. 4, pp. 1956-1960.*

(Continued)

*Primary Examiner* — Tesfaldet Bocure
*Assistant Examiner* — Lawrence Williams
(74) *Attorney, Agent, or Firm* — Coats & Bennett, P.L.L.C.

(57) ABSTRACT

A multi-branch OFDM receiver combines diversity signals received over different receiver branches using interference rejection combining. The receiver generates first channel estimates associated with a serving base station, second channel estimates associated with at least one non-serving base station, and a time offset between the serving base station and non-serving base station. The receiver computes a noise covariance matrix based on the second channel estimates and the time offset, and then combines the diversity signals received over different branches using the first channel estimates and the noise covariance matrix.

16 Claims, 3 Drawing Sheets

OTHER PUBLICATIONS

Bottomley et al., Interference Cancellation for Improved Channel Estimation in Array Processing MSLE Receivers, 1997, Vehicular Technology Conference, 1997 IEEE 47th, vol. 1, pp. 140-144.*

Kopsa et al., Mu;tiuser Space-Time Algorithms for Syncronization, Channel Estimation, and Data Detection in an Interference Monitoring System for UMTS/TDD Networks, 2007, Communications, IEEE Transactions on, vol. 55, Issue: 10, pp. 1973-1983.*

* cited by examiner

METHOD AND APPARATUS FOR INTERFERENCE REJECTION COMBINING AND DETECTION

RELATED APPLICATIONS

This application claims the benefit of U.S. Provisional Patent Application 60/986,143, filed Nov. 7, 2007, which is incorporated herein by reference.

TECHNICAL FIELD

The present invention relates generally to methods for reducing intercell interference between mobile terminals in a mobile communication system and, more particularly, to a method and apparatus or interference rejection combining.

BACKGROUND

The 3rd Generation Partnership Project (3GPP) has a project called Long Term Evolution (LTE) to improve the Universal Mobile Telecommunication System (UMTS) standard, which among other things improves data services over wireless communication networks. The LTE standard includes a number of features to provide higher data rates, increased system capacity, and improved spectral efficiency. These features include the use of orthogonal frequency division multiplexing (OFDM) and a multiple-input, multiple-output (MIMO) scheme in the downlink. In order to maintain backward compatibility with existing spectrum allocations for, e. g., GSM and WCDMA, the LTE systems will be able to operate on bandwidths ranging from 1.4 MHz to 20 MHz. Like WCDMA systems, the same frequencies will be used in adjacent cells. Therefore, it is important that the mobile terminals be capable of suppressing inter-cell interference.

In the case of a mobile terminal with two receive antennas, diversity-combining can be employed to improve the signal-to-noise ratio and reduce interference. Various techniques for diversity-combining are known, including equal gain combining (EGC), maximum ratio combining (MRC), and interference rejection combining (IRC). EGC is a simple combining scheme that does not require a noise estimate. MRC requires an estimate of the channel power and noise power for each antenna, while IRC requires an estimate of the noise color. Assuming that good channel estimates and noise estimates can be obtained, IRC is usually better than MRC and EGC.

The channel estimates and noise estimates are usually obtained from pilot symbols. In general, increasing the number of pilot symbols transmitted improves channel and noise estimation at the expense of greater signaling overhead. Decreasing the number of pilot symbols transmitted can negatively impact the quality of the channel and noise estimates. When there are an insufficient number of pilot symbols to generate accurate channel and noise estimates, IRC may not provide any improvement over MRC, and may even be worse.

Accordingly, there is a need for new methods for generating accurate channel and noise estimates for interference cancellation and suppression.

SUMMARY

The present invention relates generally to methods for detecting a desired signal in the presence of inter-cell interference. One exemplary embodiment comprises a multi-branch OFDM receiver that combines diversity signals received over different receiver branches using interference rejection combining. The receiver generates first channel estimates associated with a serving base station, second channel estimates associated with a non-serving base station, and a time offset between the serving base station and non-serving base station. The receiver computes a noise covariance matrix based on the second channel estimates and the time offset, and then combines the received diversity signals received over different branches using the first channel estimates and the noise covariance matrix.

In some embodiments, the noise covariance matrix is computed for each one of a plurality of subcarriers in an OFDM signal, and the diversity signals received on each subcarrier are combined using a respective noise covariance matrix for the subcarrier. The noise covariance matrix for multiple non-serving base stations can also be estimated and used to combine the received diversity signals. More particularly, a noise covariance matrix associated with each non-serving base station can be computed and summed to generate a total noise covariance matrix. The total noise covariance matrix can then be used to combine the received diversity signals.

DETAILED DESCRIPTION OF THE INVENTION

Figure 1:
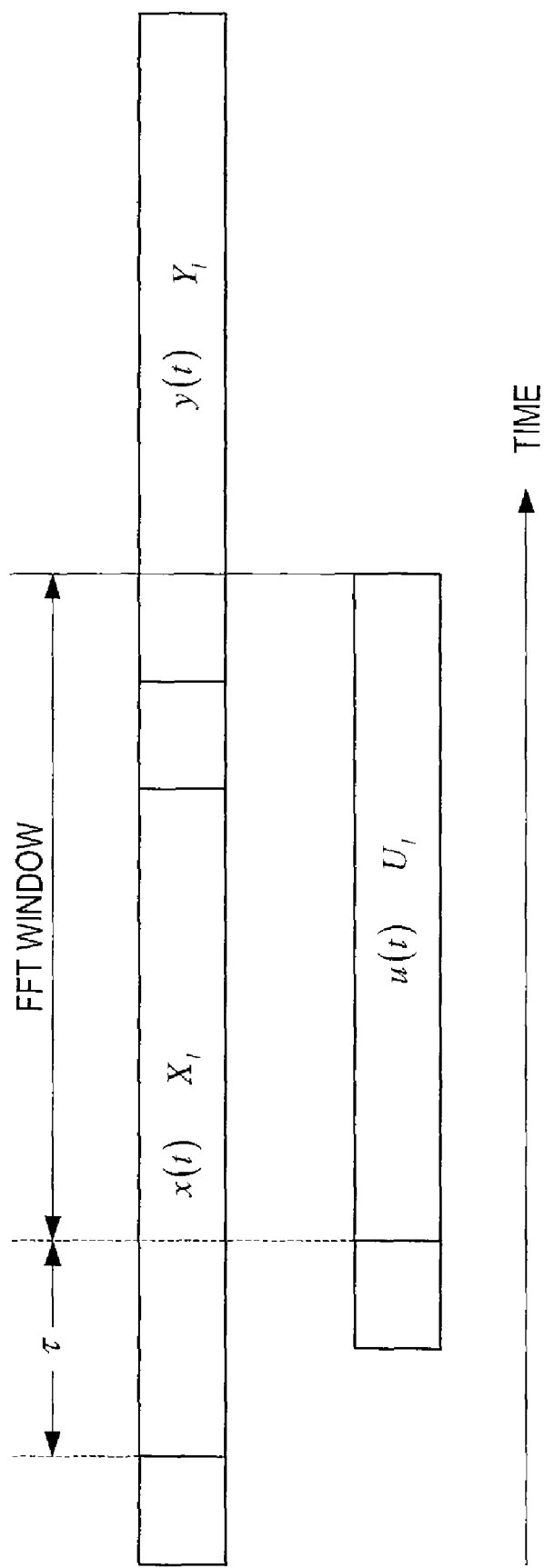
FIG. 1 illustrates a model for estimating noise covariance as a function of the relative timing between a serving cell and a neighboring cell.

FIG. 1 illustrates an exemplary model for estimating noise covariance as a function of the relative timing between a serving cell (SC) and a neighboring cell (NBC). As used herein, the term noise relates to noise and interference, including inter-cell interference. The time domain signal corresponding to a serving cell is denoted u(t). Overlapping time domain signals transmitted in a neighboring cell are denoted x(t) and y(t). The relative timing difference between the serving cell and non-serving cell is denoted τ. The FFT window for processing the received signal is placed such that the FFT window is time-aligned with the serving cell timing. The frequency domain signal at antenna i and subcarrier l of an OFDM signal is given by:

$$Z_l^i = H_l^i U_l + \epsilon_l^i(\tau), l=1,\ldots,N, i=1,\ldots,M_{ant} \quad (1)$$

where $H_l^i$ represents the channel to antenna i on subcarrier l. $U_l$ is the symbol transmitted from the serving cell on subcarrier l of the OFDM signal. N is the number of subcarriers in the OFDM signal and M is the number of antennas or receiver branches at the receiver. The term $\epsilon_l^i(\tau)$, hereinafter referred to as the noise estimate, represents noise and interference, which includes inter-cell interference, where τ is the time offset between the serving cell timing and the neighboring cell timing. The noise estimate $\epsilon_l^i(\tau)$ can be written as:

$$\epsilon_l^i(\tau) = g(l, \tau, N)\left(X_l^i + \frac{1}{N}\sum_{k=1}^{N}(Y_k^i - X_k^i)f(k, l, N, \tau)\right) \quad (2)$$

where $g(l,\tau,N)$ is given by $$g(l, \tau, N) = e^{\frac{j2\pi(l-1)\tau}{N}} \qquad (3)$$

and $f(k,l,N,\tau)$ is given by $$f(k, l, N, \tau) = \sum_{n=1}^{\tau} (e^{\frac{j2\pi(k-l)}{N}})^{n-1} \qquad (4)$$

The terms $X_l^i$ and $Y_k^i$ in Equation 2, represent interfering symbols transmitted by a base station in a neighboring cell and received at the receiver. The interfering symbol $X_l^i$ is modeled by $X_l^i = G_l^i V_l$ where $G_l^i$ is the channel on subcarrier l from the base station in the neighboring cell to antenna i and $V_l$ is the transmitted symbol on subcarrier l. The transmitted symbol $V_l$ is unknown but can be assumed to be an independent and identically-distributed random variable with a noise power of $(\sigma_l^i)^2$. Similarly, the interfering symbol $Y_k^i$ is modeled by $Y_k^i = G_k^i V_k$ where $G_k^i$ is the channel on subcarrier k from the base station in the neighboring cell to antenna i and $V_k$ is the transmitted symbol on subcarrier k.

The channel $G_l^i$ for each subcarrier can be estimated using demodulated pilot symbols transmitted by the neighboring cell. Further, assuming that there is a constant power relation between the pilot symbols and data symbols, the first and second order statistics (e.g., mean and variance) can be determined. Therefore, it is possible to derive a noise covariance made according to:

$$R_l = \{R_l\}_{ij} = E(\epsilon_l^i(\tau)\epsilon_l^j(\tau)^*) \qquad (5)$$

Assuming the power offset $\gamma$ between the pilot symbols and data symbols transmitted by the neighboring cell, the noise covariance matrix $\{R\}_{ij}$ representing the impairment across receiver branches i and j of a multi-branch receiver can be computed according to:

$$\{R_l\}_{ij} = \qquad (6)$$
$$\gamma^2 \left( \left(1 - \frac{2\tau}{N}\right) \hat{G}_l^i \hat{G}_l^{j*} + \frac{2}{N^2} \sum_{k=1}^{N} \gamma^2 \hat{G}_k^i \hat{G}_k^{j*} f(k, l, N, \tau) f^*(k, l, N, \tau) \right)$$

The noise covariance matrix computed as shown in Equation 6 can be used to perform interference rejection combining. To perform interference rejection combining, the receiver generates channel estimates for the channel from the base station in the serving cell to the receiver according to conventional techniques based on pilot symbols transmitted by the base station in the serving cell. After the serving cell channel and noise covariance matrix are estimated as described above, an estimate $D_l^{IRC}$ of the symbol transmitted from the base station in the serving cell can be computed according to $$D_l^{IRC} = \hat{H}_l^H R_l^{-1} Z_l \qquad (7)$$

where $\hat{H}_l$ is a matrix of the channel estimates from the base station in the serving cell to the receiver, R is the noise covariance matrix computed according to Equation 6, and $Z_l$ is a vector of the received symbols transmitted during one symbol period. Other symbol detection methods could also be used.

The method of interference rejection combining described above assumes that the inter-cell interference originates from a single neighboring cell. The same technique can be extended to any number of neighboring cells. A general model for the received signal assuming neighbors is given by:

$$Z_l^i = H_l^i U_l + \sum_{q=1}^{Q} \{\epsilon_l^i(\tau)\}_q, \, l = 1, \ldots, N, \, i = 1, \ldots, M_{ant} \qquad (8)$$

where Q is the number of interfering cells. For each neighboring cell, the noise covariance matrix can be derived according to Eq. 6 as described above. A total noise covariance matrix can then be obtained by summing the noise covariance matrices for each neighboring cell. Interference rejection combining is then performed according to Equation 7. This technique could be applied, for example, in an Minimum mean squared error (MMSE) receiver.

Figure 2:
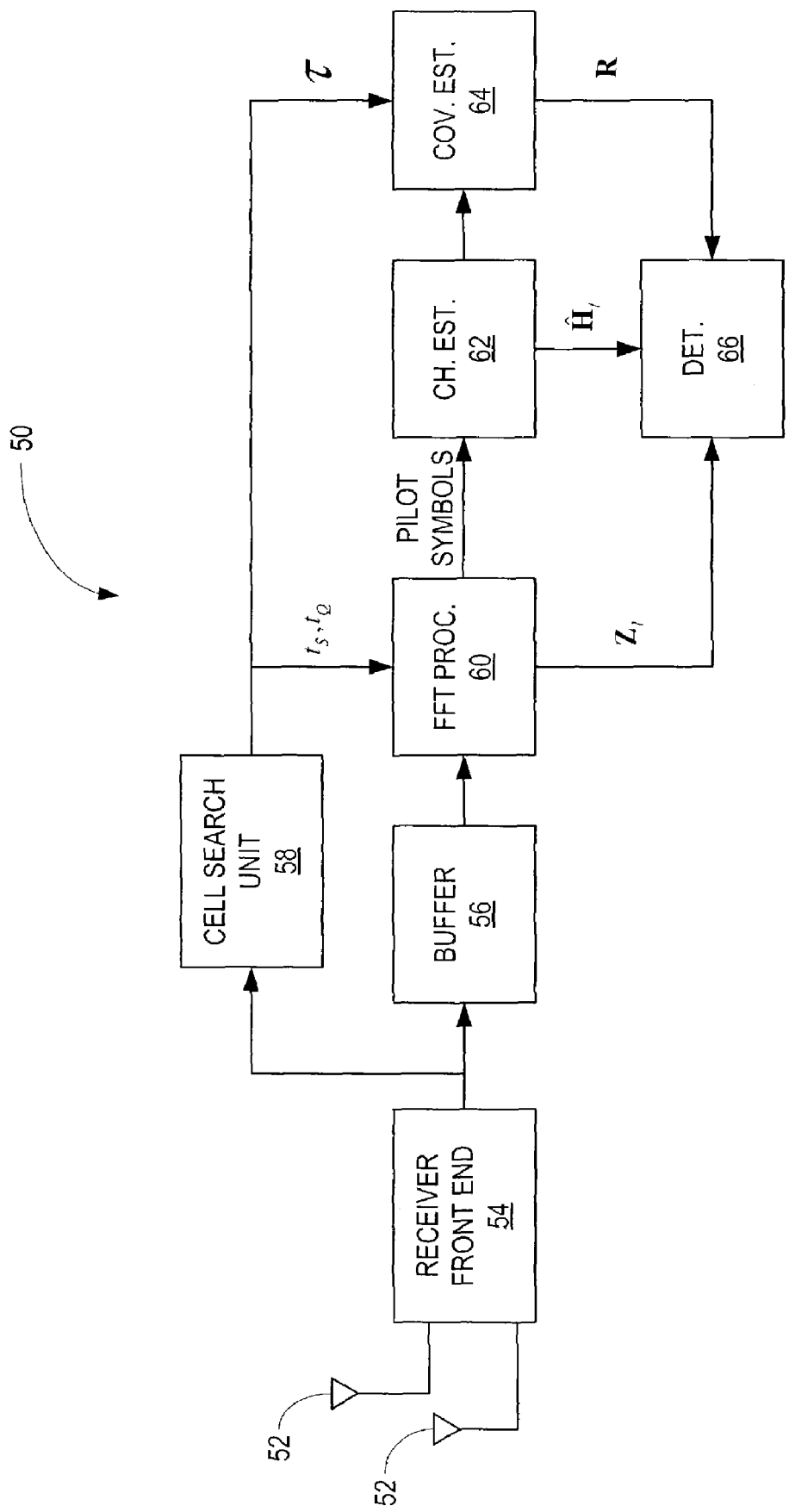
FIG. 2 is a block diagram of an exemplary multi-branch OFDM receiver according to one embodiment of the invention.

Some embodiments may use a model of the received signal that accounts for thermal noise. One such model is given by:

$$Z_l^i = H_l^i U_l + \epsilon_l^i(\tau) + e^i \qquad (9)$$

where $e^i$ is white thermal noise with variance $\sigma_e^2$. The estimate of $\sigma$ could for instance be made by estimating the variance of the residual noise when both serving and non-serving cells have been estimated. Alternatively, the total noise covariance $R^t$ for $\epsilon$ and $\sigma_e^2$ may be non-parametrically estimated. A parametric model given by:

$$R_l^t = \alpha R_l + \sigma_e^2 I \qquad \text{Eq. (10)}$$

where I is a diagonal matrix and $R_l$ is an estimate computed according to Eq. 5 can then be used to estimate $\alpha$ and $\sigma_e^2$:

FIG. 2 illustrates an exemplary mobile terminal 50 according to one embodiment of the invention. The receiver 50 comprises a receiver front end 54, buffer 56, cell search unit 58, FFT processor 60, channel estimator 62, covariance estimator 64, and detector 66. The receiver front end 54 is coupled to two or more receive antennas 52. The receiver front end 54 downconverts the signals received on each antenna to baseband frequency, performs analog-to-digital conversion, and digitally filters the received signals. Buffer 56 stores the received signals until they are processed. The received signals are applied to a cell search unit 58 which detects neighboring cells, and determines the timing for the serving cell and each neighboring cell detected. The timing $t_s$ and $t_q$ for the serving cell and neighboring cells respectively are provided to the FFT processor 60, which demodulates the received signals. The FFT processor 60 outputs demodulated pilot symbols for the serving cell and each non-serving cell to the channel estimator 62. The FFT processor 60 also provides demodulated data symbols to the detector 66. Channel estimator 62 generates channel estimates for each subcarrier of the OFDM signal for the serving cell and for each of the neighboring cells based on the demodulated pilot symbols. Any conventional or known channel estimation techniques can be used. The covariance estimator 64 uses the channel estimates for the non-serving cells to generate a noise covariance matrix for each subcarrier using the techniques described above. More particularly, the covariance estimator 64 may use Eq. 6 to compute the noise covariance matrix. Detector 66 generates an estimate of the symbol transmitted by the serving base station using interference rejection-combining techniques. More particularly, the detector 66 uses the channel estimates for the serving cell provided by the channel estimator 62 and the impairment covariance matrix R provided by the covariance estimator 64 to compute a detection statistic according to Eq. 7.

Figure 3:
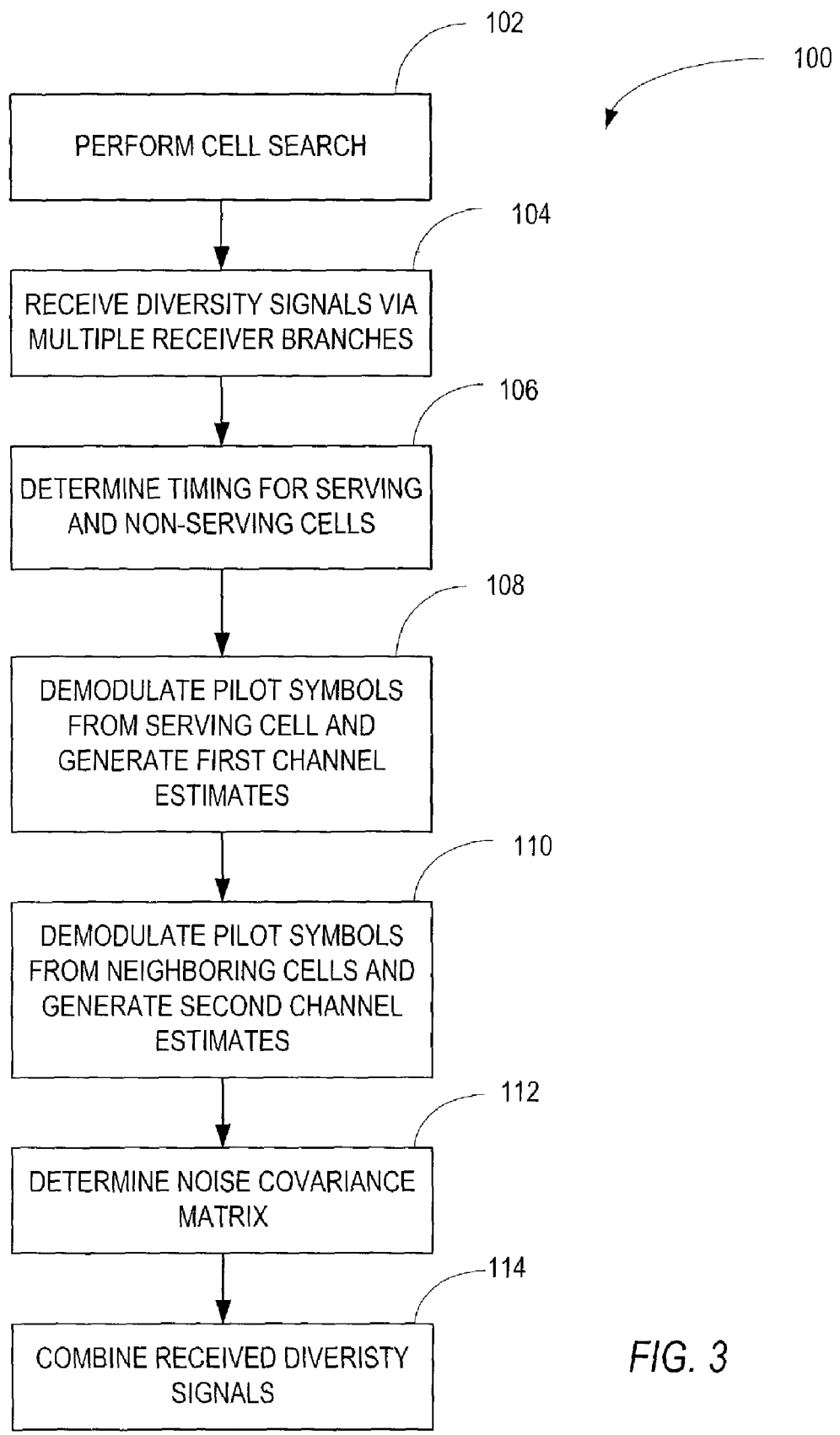
FIG. 3 illustrates an exemplary procedure implemented by a multi-branch OFDM receiver for combining diversity signals according to one embodiment of the invention.

FIG. 3 illustrates an exemplary method for detecting a received signal implemented by a mobile terminal 50 in a wireless communication system. It is assumed that the mobile terminal 50 is operating in a connected mode. The mobile terminal 50 periodically performs a cell search to detect neighboring cells (block 102) which may be used as handover candidates. The mobile terminal 50 receives a signal from a serving cell over two or more antennas 52 or receiver branches (block 104). The signals received on each antenna 52 or receiver branch are downconverted to baseband frequency, converted to digital form, and filtered by the receiver front-end 54 to generate two or more diversity signals. The cell search unit 58 determines the cell timing ($t_S$) for the serving cell and the cell timing ($t_Q$) for each neighboring cell (block 106). The cell timing is typically determined by correlating the received signals to a primary synchronization signal as is known in the art. The mobile terminal 50 synchronizes with the serving base station, demodulates the pilot symbols transmitted by the serving base station, and generates channel estimates for the channel from the serving cell to the multi-branch receiver (block 108). The mobile terminal 50 also synchronizes with each neighboring base station, demodulates pilot symbols from each neighboring base stations, and generates channel estimates for the channel from the base station in each neighboring cell to the multi-branch receiver (block 110). The mobile terminal 50 computes the noise covariance matrix according to Eq. 6 (block 112). Finally, the mobile terminal 50 computes an estimate of the symbol transmitted by the serving base station by combining the received signal from the serving base station received over different receiver branches using interference rejection combining according to Equation 7 (block 114).

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of combining diversity signals received over different branches of a multi-branch OFDM receiver, said method comprising:
    generating first channel estimates associated with a serving base station;
    generating second channel estimates associated with at least one non-serving base station;
    determining a time offset between said serving base station and said non-serving base station;
    computing a noise covariance matrix based on the second channel estimates and said time offset; and
    combining said diversity signals using said first channel estimates and said noise covariance matrix to generate an estimate of a transmitted symbol.

2. The method of claim 1 wherein computing a noise covariance based on said second channel estimates and said time offset further comprises computing said noise covariance matrix based on a power offset between pilot and data symbols.

3. The method of claim 1 wherein a noise covariance matrix is computed for each one of a plurality of subcarriers in an OFDM signal and wherein said diversity signals received on each subcarrier are combined using a respective noise covariance matrix.

4. The method of claim 1 further comprising computing a total noise covariance matrix representing the total noise covariance between a serving base station and a plurality of non-serving base stations, and wherein said total noise covariance is used to combine said diversity signals.

5. The method of claim 4 wherein computing a total noise covariance matrix comprises computing a separate noise covariance for each one of a plurality of non-serving base stations, and combining said separate noise covariance matrices to generate said total noise covariance matrix.

6. The method of claim 1 wherein computing a noise covariance matrix further includes computing a white noise coefficient and computing the noise covariance matrix based on the white noise coefficient.

7. The method of claim 1 wherein the generating of first channel estimates for a channel from a serving base station to said multi-branch receiver comprises synchronizing with the serving base station, demodulating first pilot symbols transmitted by the serving base station, and generating said first channel estimates based on the first pilot symbols.

8. The method of claim 7 wherein the generating of second channel estimates for a channel from at least one non-serving base station to said multi-branch receiver comprises synchronizing with the non-serving base station, demodulating second pilot symbols transmitted by the at least one non-serving base station, and generating said second channel estimates based on the second pilot symbols.

9. A receiver comprising:
    a channel estimator to generate first channel estimates associated with a serving base station and second channel estimates associated with a non-serving base station;
    a cell search unit to determine a time offset between said serving base station and said non-serving base station;
    a covariance estimator to compute a noise covariance matrix based on the second channel estimates and said time offset; and
    a detector to combine diversity signals received from the serving base station using said first channel estimates and said noise covariance matrix to generate an estimate of a transmitted symbol.

10. The receiver of claim 9 wherein the covariance estimator is configured to compute a noise covariance based on said second channel estimates, said time offset and a power offset between pilot and data symbols.

11. The receiver of claim 9 wherein the covariance estimator is configured to compute a noise covariance matrix for each one of a plurality of subcarriers in an OFDM signal and wherein the detector combines the diversity signals received on each subcarrier using a respective noise covariance matrix.

12. The receiver of claim 9 wherein the covariance estimator is configured to compute a total noise covariance matrix representing the total noise covariance between a serving base station and a plurality of non-serving base stations, and wherein the detector uses the total noise covariance to combine said diversity signals.

13. The receiver of claim 12 wherein the covariance estimator is configured to compute a total noise covariance matrix by computing a separate noise covariance for each one of a plurality of non-serving base stations, and combining said separate noise covariance matrices to generate said total noise covariance matrix.

14. The receiver of claim 9 wherein the covariance estimator is configured to compute a total noise covariance matrix by computing a white noise coefficient and then compute the total noise covariance based on the white noise coefficient.

15. The receiver of claim 9 further comprising an FFT processor configured to demodulate first pilot symbols from the serving base station, and wherein said channel estimator generates said first channel estimates based on the first pilot symbols.

16. The receiver of claim 15 further comprising an FFT processor configured to demodulate second pilot symbols from at least one non-serving base station, and wherein said channel estimator generates said second channel estimates based on the second pilot symbols.

\* \* \* \* \*

UNITED STATES PATENT AND TRADEMARK OFFICE
CERTIFICATE OF CORRECTION

PATENT NO.         : 8,023,600 B2
APPLICATION NO.    : 12/138743
DATED              : September 20, 2011
INVENTOR(S)        : Lindoff et al.

Page 1 of 1

It is certified that error appears in the above-identified patent and that said Letters Patent is hereby corrected as shown below:

On Page 2, in Field (56), under "OTHER PUBLICATIONS", in Column 2, Line 1, delete "Mu;tiuser" and insert -- Multiuser --, therefor.

On Page 2, in Field (56), under "OTHER PUBLICATIONS", in Column 2, Line 1, delete "Syncronization," and insert -- Synchronization, --, therefor.

In Column 4, Line 32, delete "$\sigma_e^2$:" and insert -- $\sigma_e^2$. --, therefor.

Signed and Sealed this
Twenty-first Day of February, 2012

David J. Kappos
*Director of the United States Patent and Trademark Office*